United States Patent
Kenkel et al.

(10) Patent No.: US 11,421,399 B2
(45) Date of Patent: Aug. 23, 2022

(54) LOAD SENSITIVE RIDE SYSTEM FOR A VEHICLE

(71) Applicant: DEERE & COMPANY, Moline, IL (US)

(72) Inventors: Aaron R. Kenkel, Dubuque, IA (US); Michael G. Kean, Dubuque, IA (US); Mary B. Wigginton, Dubuque, IA (US); Michael R. Gratton, Dubuque, IA (US); Grant R. Henn, Dubuque, IA (US); Todd F. Velde, Dubuque, IA (US); Joseph R. Keene, Dubuque, IA (US); Kevin W. Campbell, Dubuque, IA (US); Dustin T. Staade, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 356 days.

(21) Appl. No.: 16/670,262

(22) Filed: Oct. 31, 2019

(65) Prior Publication Data
US 2021/0131063 A1    May 6, 2021

(51) Int. Cl.
*B60C 23/00*   (2006.01)
*E02F 9/22*    (2006.01)
(Continued)

(52) U.S. Cl.
CPC .......... *E02F 9/2029* (2013.01); *B60C 23/002* (2013.01); *E02F 3/431* (2013.01);
(Continued)

(58) Field of Classification Search
CPC ...... F15B 1/021; F15B 19/005; B60C 23/002; B60S 5/04; B60S 5/043; B60S 5/046
See application file for complete search history.

(56) References Cited

U.S. PATENT DOCUMENTS

| | | | | |
|---|---|---|---|---|
| 5,897,287 A * | 4/1999 | Berger | ................. | E02F 9/2207 |
| | | | | 414/699 |
| 6,749,035 B2 * | 6/2004 | Bundy | .................... | E02F 9/226 |
| | | | | 180/41 |

(Continued)

FOREIGN PATENT DOCUMENTS

EP    2843378 A1    3/2015

*Primary Examiner* — Michael Leslie
(74) *Attorney, Agent, or Firm* — Taft Stettinius & Hollister LLP; Stephen F. Rost (57) ABSTRACT

A load sensitive ride system and method is disclosed for a vehicle with an implement movably attached by a boom cylinder. The system includes a payload weight measuring system that measures payload weight and generates a signal indicative of the payload weight, a ride control circuit that adjusts hydraulic flow to and from the boom cylinder; and a controller that receives the signal indicative of the payload weight, and sends compliance commands to adjust ride control compliance based on the signal indicative of the payload weight. The system can include a tire inflation system that adjusts tire pressure. The controller can send inflation commands to adjust tire pressure based on the signal indicative of the payload weight. The compliance commands can depend on the components and compliance adjustment methods of the ride control circuit.

20 Claims, 4 Drawing Sheets

(51) Int. Cl.
*F15B 19/00* (2006.01)
*F15B 1/02* (2006.01)
*F15B 1/033* (2006.01)
*E02F 9/20* (2006.01)
*E02F 3/43* (2006.01)
*E02F 3/28* (2006.01)

(52) U.S. Cl.
CPC .......... *E02F 9/2058* (2013.01); *E02F 9/2217* (2013.01); *E02F 9/2228* (2013.01); *E02F 9/2271* (2013.01); *F15B 1/021* (2013.01); *F15B 19/005* (2013.01); *B60C 2200/065* (2013.01); *B60C 2200/08* (2013.01); *E02F 3/283* (2013.01); *F15B 1/033* (2013.01); *F15B 2211/625* (2013.01)

(56) References Cited

U.S. PATENT DOCUMENTS

| | | | |
|---|---|---|---|
| 7,448,208 B2* | 11/2008 | Montineri | B66F 9/065 |
| | | | 60/469 |
| 7,621,124 B2* | 11/2009 | Mizoguchi | E02F 9/2217 |
| | | | 60/469 |
| 7,703,280 B2* | 4/2010 | Kobayashi | E02F 9/2207 |
| | | | 60/469 |
| 8,307,641 B2 | 11/2012 | Hanks et al. | |
| 9,145,659 B2 | 9/2015 | Walz et al. | |
| 9,873,296 B2* | 1/2018 | Wieckhorst | B60C 23/004 |
| 10,053,838 B2 | 8/2018 | Kean et al. | |
| 10,246,854 B2* | 4/2019 | Greer | E02F 3/3414 |
| 10,494,790 B2* | 12/2019 | Duppong | E02F 9/2217 |
| 2013/0299266 A1 | 11/2013 | Ho et al. | |
| 2017/0130739 A1 | 5/2017 | Zhang et al. | |
| 2020/0247194 A1* | 8/2020 | Thompson | B60C 23/002 |

* cited by examiner

LOAD SENSITIVE RIDE SYSTEM FOR A VEHICLE

FIELD OF THE DISCLOSURE

The present disclosure relates to hydraulic systems, and more particularly to ride control and tire inflation systems for vehicles.

BACKGROUND

Various machines or vehicles, for example those equipped with a boom and work implement, may include a ride control system to improve the machine's ride over different types of terrain with either an empty or loaded work implement. Ride control systems can add and remove compliance from the hydraulic circuit that supports the boom. During movement of the machine, fluid can transfer between a boom cylinder and the ride control system to allow movement of the boom relative to the rest of the machine. In addition, the comfort and performance of a vehicle ride can be affected by the tire pressure of the vehicle. These systems can reduce fore and aft rocking motion and bouncing of the machine as the ride control and tire inflation systems will help absorb some of the energy created by the inertial forces of the machine and the payload.

The ride of a machine is affected by payload weight, for example the weight of material in a bucket of a loader. A machine can have presets for the compliance of its ride control system and its tire pressure, which provide a generally acceptable level of ride comfort by reducing expected shock loads on the machine. However, payload weight varies significantly in the normal course of operation depending on whether the machine has a full load, empty load or some load in-between. An average preset compliance for the ride control system and preset tire pressure may not be desirable in all situations.

It would be desirable for a machine to dynamically determine payload weight and then automatically adjust the compliance of the ride control system and/or the tire pressure based on the current determined payload weight.

SUMMARY

A load sensitive ride system is disclosed for a vehicle that includes an implement movably attached to the vehicle by a boom cylinder. The load sensitive ride system includes a payload weight measuring system, a ride control circuit and a controller. The payload weight measuring system is configured to measure payload weight in the implement and generate a signal indicative of the payload weight. The ride control circuit is configured to adjust hydraulic flow to and from the boom cylinder. The controller is configured to receive the signal indicative of the payload weight, and send compliance commands to adjust compliance of the ride control circuit based on the signal indicative of the payload weight. When the signal indicative of the payload weight indicates increases in the payload weight, the controller can send compliance commands to decrease compliance in the ride control circuit; and when the signal indicative of the payload weight indicates decreases in the payload weight, the controller can send compliance commands to increase compliance in the ride control circuit.

The vehicle can also include a tire having a tire pressure, and the load sensitive ride system can also include a tire inflation system configured to adjust the tire pressure of the tire of the vehicle. The controller can also be configured to send inflation commands to the tire inflation system to adjust tire pressure based on the signal indicative of the payload weight. When the signal indicative of the payload weight indicates increases in the payload weight, the controller can send inflation commands to increase tire pressure; and when the signal indicative of the payload weight indicates decreases in the payload weight, the controller can send inflation commands to decrease tire pressure.

The ride control circuit can include an accumulator hydraulically coupled to the boom cylinder, where the accumulator has an adjustable pre-charge pressure. When the signal indicative of the payload weight indicates increases in the payload weight, the controller can send compliance commands to increase the adjustable pre-charge pressure of the accumulator to decrease compliance in the ride control circuit; and when the signal indicative of the payload weight indicates decreases in the payload weight, the controller can send compliance commands to decrease the adjustable pre-charge pressure of the accumulator to increase compliance in the ride control circuit.

The ride control circuit can include an accumulator hydraulically coupled to the boom cylinder, and a compliance adjustment valve that is configured to control a flow rate between the boom cylinder and the accumulator. When the signal indicative of the payload weight indicates increases in the payload weight, the controller can send compliance commands to the compliance adjustment valve to decrease the flow rate between the boom cylinder and the accumulator to decrease compliance in the ride control circuit; and when the signal indicative of the payload weight indicates decreases in the payload weight, the controller can send compliance commands to the compliance adjustment valve to increase the flow rate between the boom cylinder and the accumulator to increase compliance in the ride control circuit.

The ride control circuit can also include a ride control enable valve that is configured to control flow between the boom cylinder and the accumulator. When ride control is enabled, the ride control enable valve can allow flow between the boom cylinder and the accumulator; and when ride control is not enabled, the ride control enable valve can block flow between the boom cylinder and the accumulator.

A load sensitive ride method is disclosed for a vehicle that includes an implement movably attached to the vehicle by a boom cylinder. The load sensitive ride method includes measuring a payload weight in the implement; receiving a signal indicative of the payload weight; determining a compliance adjustment amount for a ride control circuit based on the signal indicative of the payload weight; and sending a compliance command to adjust compliance of the ride control circuit by the compliance adjustment amount. The ride control circuit is configured to control hydraulic flow to and from the boom cylinder. Determining a compliance adjustment amount can include: when the signal indicative of the payload weight indicates increases in the payload weight, determining a compliance adjustment amount to decrease compliance in the ride control circuit; and when the signal indicative of the payload weight indicates decreases in the payload weight, determining a compliance adjustment amount to increase compliance in the ride control circuit.

The load sensitive ride method can also include determining an inflation adjustment amount for a tire inflation system based on the signal indicative of the payload weight; and sending an inflation command to the tire inflation system to adjust tire pressure by the inflation adjustment amount. The tire inflation system can adjust tire pressure of a tire of the vehicle. Determining an inflation adjustment amount can include: when the signal indicative of the payload weight indicates increases in the payload weight, determining an inflation adjustment amount to increase tire pressure; and when the signal indicative of the payload weight indicates decreases in the payload weight, determining an inflation adjustment amount to decrease tire pressure.

The ride control circuit can include an accumulator hydraulically coupled to the boom cylinder, where the accumulator has an adjustable pre-charge pressure. Determining a compliance adjustment amount can include when the signal indicative of the payload weight indicates increases in the payload weight, determining a compliance adjustment amount to increase the adjustable pre-charge pressure of the accumulator to decrease compliance in the ride control circuit; and when the signal indicative of the payload weight indicates decreases in the payload weight, determining a compliance adjustment amount to decrease the adjustable pre-charge pressure of the accumulator to increase compliance in the ride control circuit.

The ride control circuit can include an accumulator hydraulically coupled to the boom cylinder, and a compliance adjustment valve configured to control a flow rate between the boom cylinder and the accumulator. Determining a compliance adjustment amount can include when the signal indicative of the payload weight indicates increases in the payload weight, determining a compliance adjustment amount to decrease the flow rate through the compliance adjustment valve to decrease compliance in the ride control circuit; and when the signal indicative of the payload weight indicates decreases in the payload weight, determining a compliance adjustment amount to increase the flow rate through the compliance adjustment valve to increase compliance in the ride control circuit.

The ride control circuit can include a ride control enable valve configured to control flow between the boom cylinder and the accumulator. The method can also include when ride control is enabled, allowing hydraulic flow through the ride control enable valve between the boom cylinder and the accumulator, and when ride control is not enabled, blocking hydraulic flow through the ride control enable valve between the boom cylinder and the accumulator.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
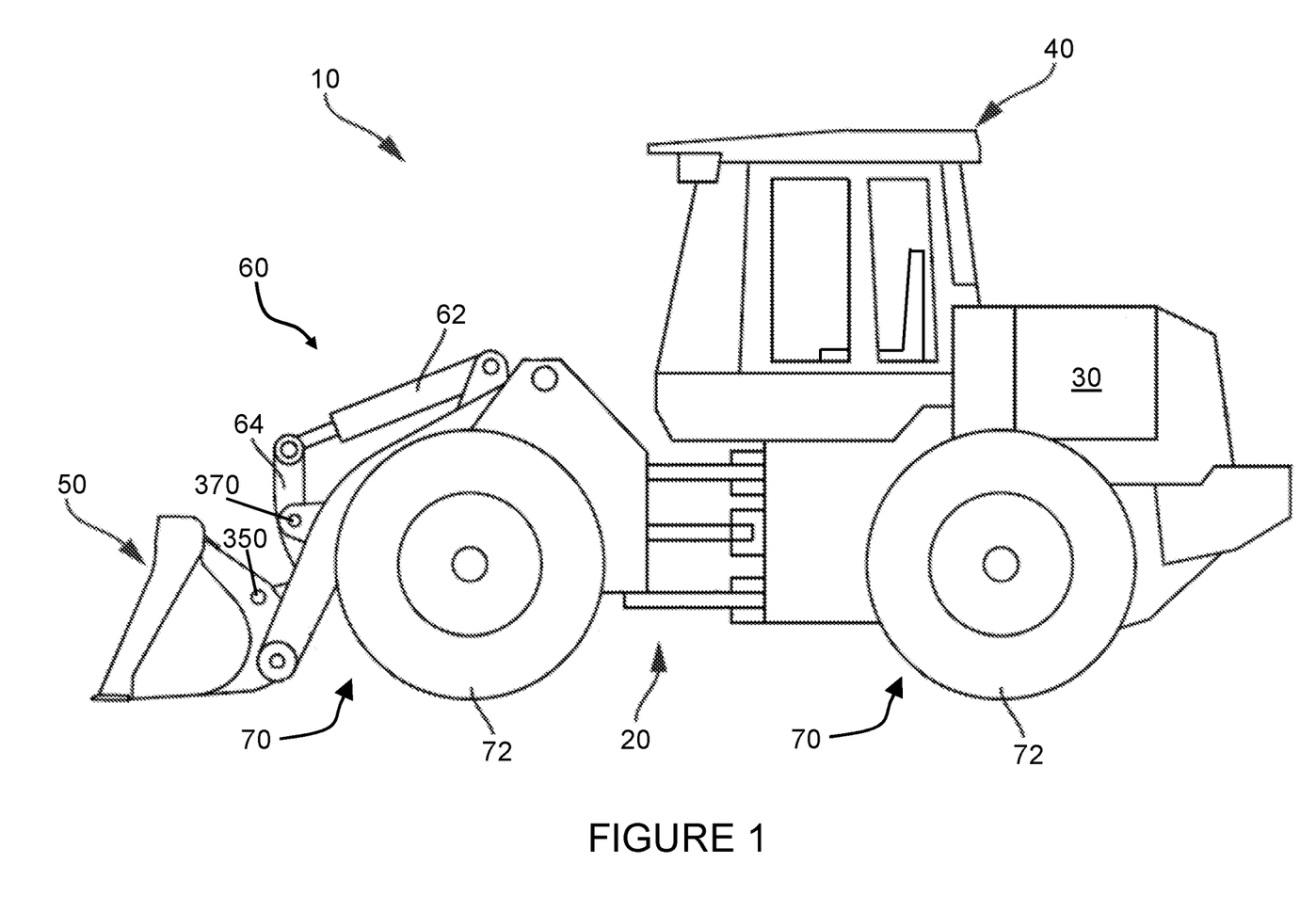
FIG. 1 illustrates an exemplary work machine that can include a load sensitive ride system with an adjustable ride control system and/or tire inflation system.

FIG. 1 illustrates an exemplary work machine 10 that can include a load sensitive ride system with an adjustable ride control system and/or tire inflation system. The work machine 10 is a mobile machine that can perform operations associated with construction, agriculture, forestry, transportation, mining or other industries. The work machine 10 can include a chassis 20 that supports a power source 30, an operator cab 40 a work implement 50 and boom 60. The power source 30 may be an engine such as, for example, a diesel, gasoline or other type of engine, that powers the movement of traction devices 70 for movement of the work machine 10. The traction devices 70 can be wheels with inflatable tires 72. The work implement 50 can be movably attached to the work machine 10 by the boom 60 which can include one or more boom cylinders 62, and boom linkage 64.

Figure 2:
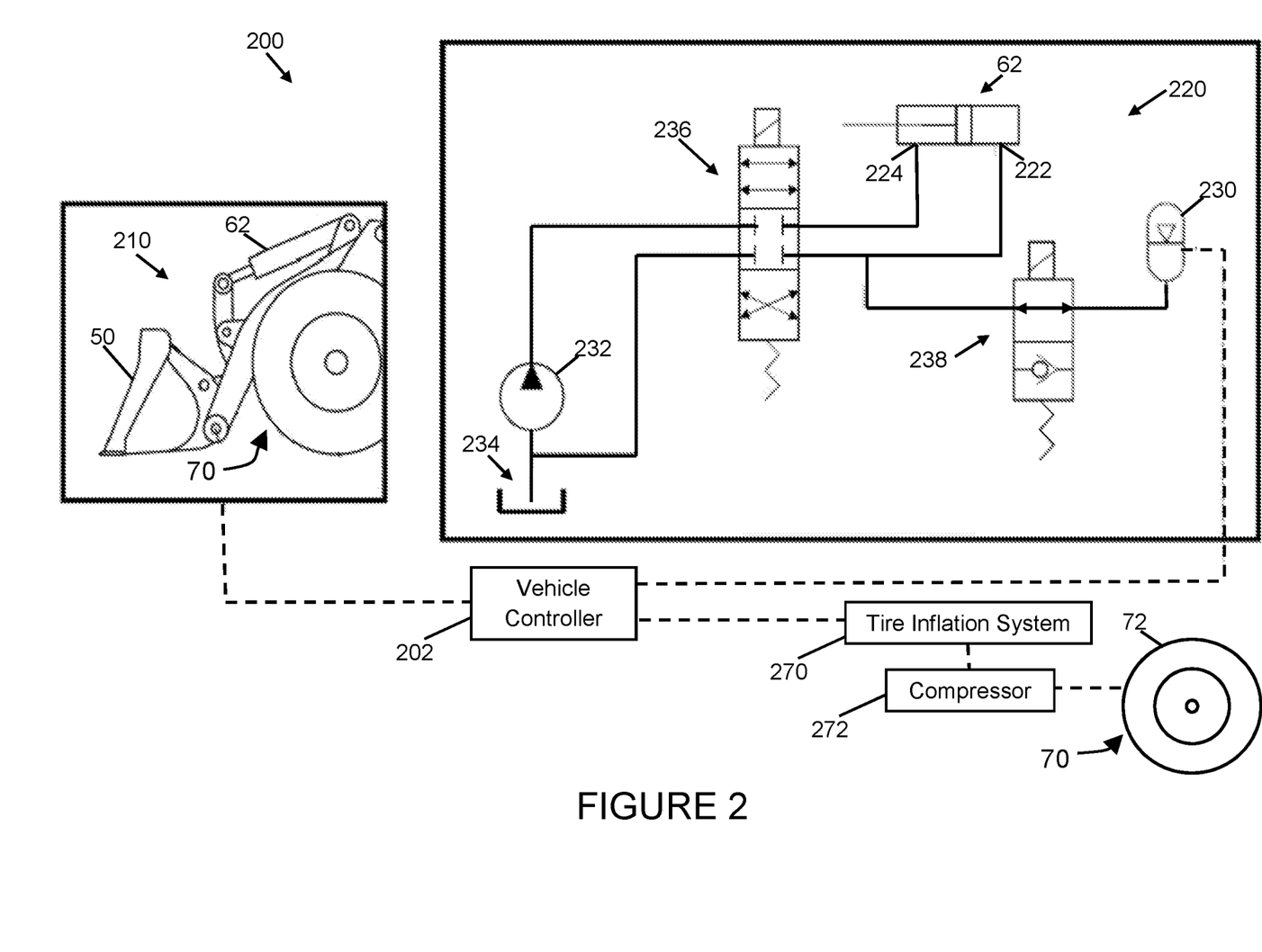
FIG. 2 illustrates an exemplary load sensitive ride system with a vehicle controller, a payload weight measuring system, a ride control hydraulic circuit and a tire inflation system.

FIG. 2 illustrates an exemplary load sensitive ride system 200 with a vehicle controller 202, a payload weight measuring system 210, a ride control hydraulic circuit 220 and a tire inflation system 270. The payload weight measuring system 210 can continuously measure payload weight in the implement 50 of the vehicle 10. The payload weight measuring system 210 can be dynamic, in that it does not measure payload weight in only prescribed operations but rather can measure payload weight in all conditions. Examples of a payload weight measuring system 210 that could be used are disclosed in European Patent Publication No. EP 2 843 378 and U.S. Pat. No. 10,053,838. The vehicle controller 202 receives a signal indicative of the payload weight in the bucket 50 from the payload weight measuring system 210. Based on the signal indicative of the payload weight, the vehicle controller 202 sends commands to the ride control hydraulic circuit 220 and the tire inflation system 270.

The exemplary ride control hydraulic circuit 220 controls flow to and from one or more boom hydraulic cylinders 62. Each boom cylinder 62 includes a head intake 222 and a rod intake 224. The ride control hydraulic circuit 220 includes an accumulator 230, a hydraulic source 232, a tank or fluid reservoir 234, a boom control valve 236, and a ride control enable valve 238. The hydraulic source 232 can be the main hydraulic system of the vehicle. In this embodiment, the accumulator 230 has an adjustable pre-charge pressure. Increasing the pre-charge pressure of the accumulator 230 makes the ride control circuit 220 less compliant (more stiff), and decreasing the pre-charge pressure of the accumulator 230 makes the ride control circuit 220 more compliant (less stiff).

The ride control enable valve 238 controls flow between the head intake 222 of the boom hydraulic cylinder 62 and the accumulator 230. When ride control is enabled, the ride control enable valve 238 allows flow between the head intake 222 of the boom hydraulic cylinder 62 and the accumulator 230. When ride control is disabled, the ride control enable valve 238 acts as a check valve that blocks flow from the head intake 222 to the accumulator 230, but allows flow from the accumulator 230 to the head intake 222.

The boom control valve 236 controls flow between the head and rod intakes 222, 224 of the boom cylinder 62 and the hydraulic source 232 and the tank 234. In a first position, the boom control valve 236 allows flow between the hydraulic source 232 and the rod intake 224 and allows flow between the tank 234 and the head intake 222. In a second position, the boom control valve 236 blocks flow between the head and rod intakes 222, 224 and the hydraulic source 232 and the tank 234. In a third position, the boom control valve 236 allows flow between the hydraulic source 232 and the head intake 222, and allows flow between the tank 234 and the rod intake 224.

The tire inflation system 270 is coupled to a compressor 272 which is coupled to the tires 72 of the vehicle 10. The tire inflation system 270 can send commands to inflate the tires 72 using the compressor 272, and to deflate the tires 72.

When the signal indicative of the payload weight from the payload weight measuring system 210 indicates an increase in payload weight, the vehicle controller 202 performs one or both of the following actions. The vehicle controller 202 sends a compliance command to increase the pre-charge pressure of the ride control accumulator 230 which makes the ride control system 220 less compliant. The vehicle controller 202 sends an inflation command to the tire inflation system 270 to increase the inflation pressure of the tires 72.

When the signal indicative of the payload weight from the payload weight measuring system 210 indicates a decrease in payload weight, the vehicle controller 202 performs one or both of the following actions. The vehicle controller 202 sends a compliance command to decrease the pre-charge pressure of the ride control accumulator 230 which makes the ride control system 220 more compliant. The vehicle controller 202 sends an inflation command to the tire inflation system 270 to decrease the inflation pressure of the tires 72.

Figure 3:
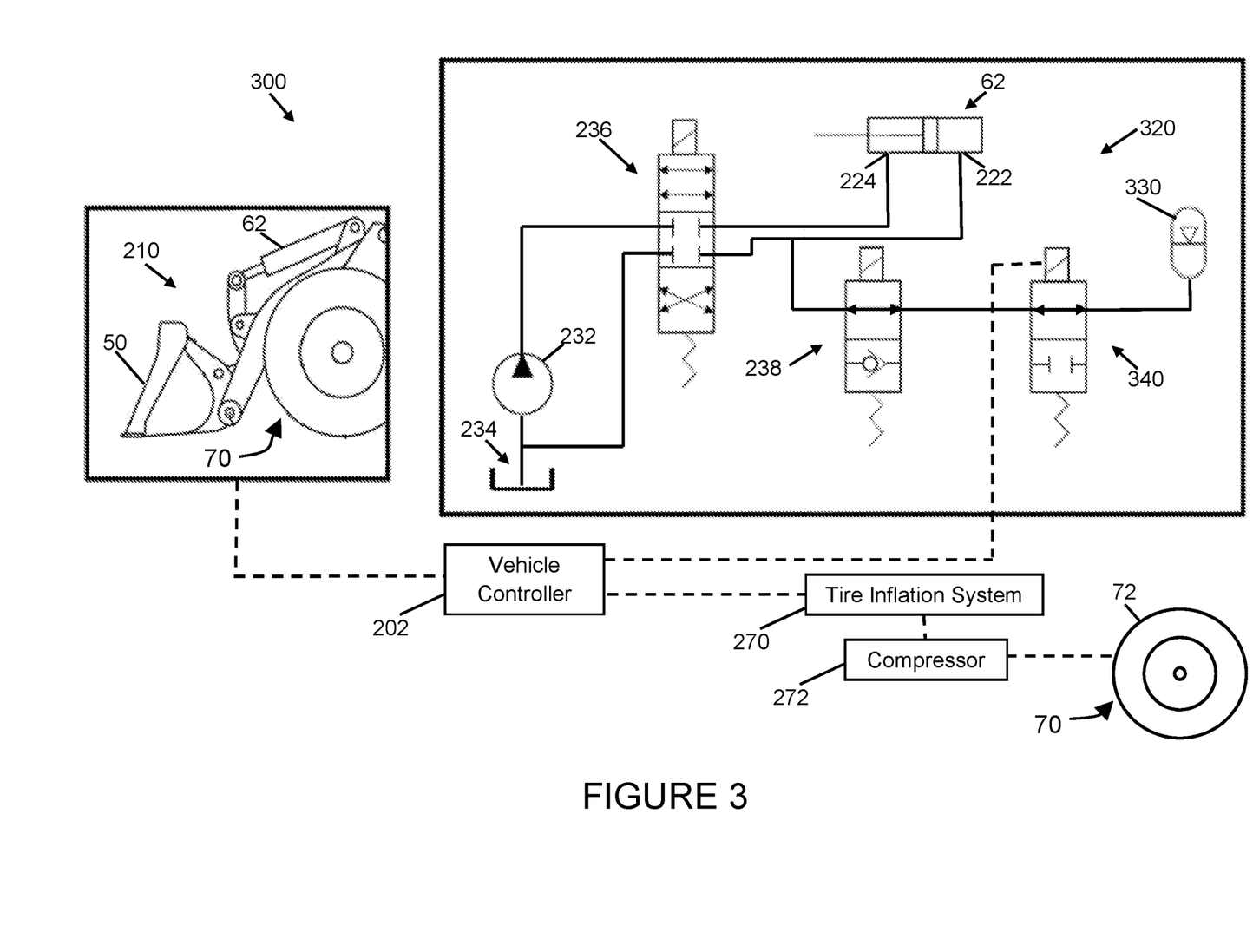
FIG. 3 illustrates an exemplary load sensitive ride system with a vehicle controller, a payload weight measuring system and a tire inflation system like those in the embodiment of FIG. 2, but with an alternative ride control hydraulic circuit.

FIG. 3 illustrates an exemplary load sensitive ride system 300 with a vehicle controller 202, a payload weight measuring system 210 and a tire inflation system 270 like those in the embodiment of FIG. 2, but with an alternative ride control hydraulic circuit 320. The payload weight measuring system 210 can continuously measure payload weight in the implement 50 of the vehicle 10. The payload weight measuring system 210 can be dynamic, in that it does not measure payload weight in only prescribed operations but rather can measure payload weight in all conditions. The vehicle controller 202 receives a signal indicative of the payload weight from the payload weight measuring system 210. Based on the signal indicative of the payload weight, the vehicle controller 202 sends commands to the ride control hydraulic circuit 320 and the tire inflation system 270.

The exemplary ride control hydraulic circuit 320 controls flow to and from one or more boom hydraulic cylinders 62. Each boom cylinder 62 includes a head intake 222 and a rod intake 224. The ride control hydraulic circuit 320 includes a hydraulic source 232, a tank or fluid reservoir 234, a boom control valve 236, and a ride control enable valve 238 like those in the embodiment of FIG. 2. However, the ride control can include an alternative accumulator 330 and an additional ride control compliance adjustment valve 340. In this embodiment, the accumulator 330 does not need an adjustable pre-charge pressure, but instead the ride control compliance adjustment valve 340 is used to adjust the compliance of the ride control circuit 320.

The ride control enable valve 238 and the compliance adjustment valve 340 cooperatively control flow between the head intake 222 of the boom hydraulic cylinder 62 and the accumulator 330. When ride control is enabled, the ride control enable valve 238 allows flow between the head intake 222 of the boom hydraulic cylinder 62 and the compliance adjustment valve 340. The compliance adjustment valve 340 is a variably adjustable valve that can be variably opened and closed to adjust the rate of flow between the head intake 222 and the accumulator 330. When ride control is disabled, the ride control enable valve 238 acts as a check valve that blocks flow from the head intake 222 to the compliance adjustment valve 340 and the accumulator 330, but allows reverse flow from the accumulator 330 and the compliance adjustment valve 340 to the head intake 222. Thus in this embodiment, the ride control enable valve 238 can enable and disable the ride control system 320, and when the ride control system 320 is enabled then the compliance adjustment valve 340 can be variably opened and closed to add and remove (adjust) compliance in the ride control system 320.

The boom control valve 236 functions as described above with regard to FIG. 2. The tire inflation system 270 also functions as described above with regard to FIG. 2.

In the embodiment of FIG. 3, when the signal indicative of the payload weight from the payload weight measuring system 210 indicates an increase in payload weight, the vehicle controller 202 performs one or both of the following actions. The vehicle controller 202 sends a compliance command to the ride control compliance adjustment valve 340 to close down a designated amount to reduce flow rate between the head intake 222 and the accumulator 330 which makes the ride control system 320 less compliant. The vehicle controller 202 sends an inflation command to the tire inflation system 270 to increase the inflation pressure of the tires 72.

In the embodiment of FIG. 3, when the signal indicative of the payload weight from the payload weight measuring system 210 indicates a decrease in payload weight, the vehicle controller 202 performs one or both of the following actions. The vehicle controller 202 sends a compliance command to the ride control compliance adjustment valve 340 to open up a designated amount to increase flow rate between the head intake 222 and the accumulator 330 which makes the ride control system 320 more compliant. The vehicle controller 202 sends an inflation command to the tire inflation system 270 to decrease the inflation pressure of the tires 72.

Figure 4:
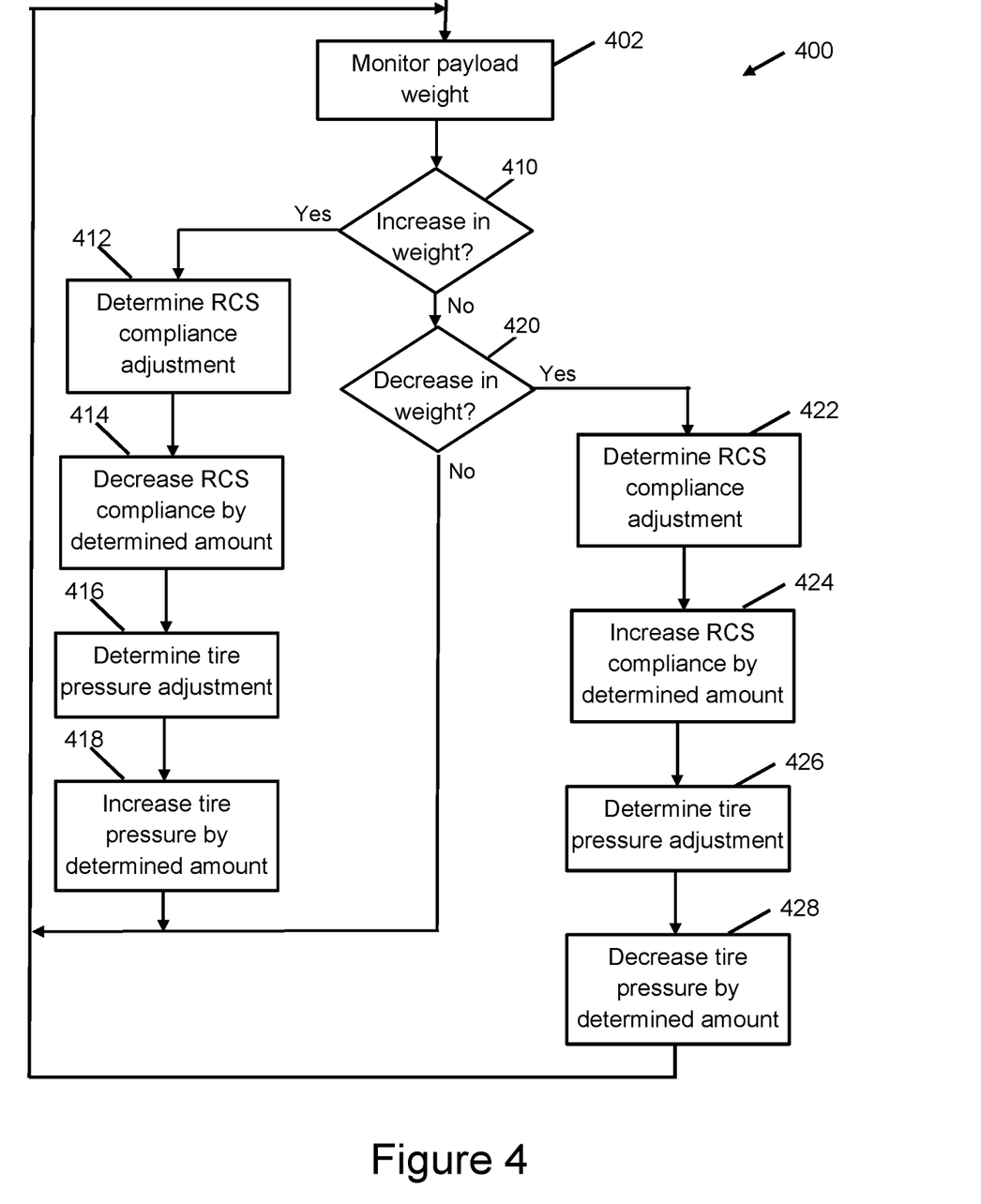
FIG. 4 illustrates an exemplary control flow for a load sensitive ride system that includes both an adjustable ride control system and an adjustable tire inflation system.

FIG. 4 illustrates an exemplary control flow 400 for a load sensitive ride system that includes both an adjustable ride control system and an adjustable tire inflation system. At block 402, the system monitors the payload weight using a payload weight measuring system. The payload weight measuring system can continuously measure payload weight, without requiring any prescribed operations. At block 410, the system checks whether there has been an increase in the payload weight. The system can use a weight increase threshold which has to be exceeded before commands are sent to the ride control and/or tire inflation systems. If a payload weight increase is detected then control passes to block 412, otherwise control passes to block 420.

At block 412, the load sensitive ride system determines the desired compliance adjustment for the ride control due to the increase in payload weight. This compliance adjustment depends on the type of ride control system, for example it could be an increase in ride control accumulator pre-charge pressure (see FIG. 2), or increased flow restriction in the ride control compliance adjustment valve (see FIG. 3), or some other adjustment depending on how compliance is adjusted in the relevant ride control system. The load sensitive ride system determines the compliance adjustment as a function of the payload weight increase, and at block 414 sends a command to decrease ride control system compliance by the determined amount. At block 416, the load sensitive ride system determines the desired adjustment to tire pressure due to the increase in payload weight. At block 418, the load sensitive ride system sends a command to the tire inflation system to increase tire pressure by the determined amount. After the ride control system compliance and tire pressure adjustments have been made control passes back to block 402.

At block 420, the system checks whether there has been a decrease in the payload weight. The system can use a weight decrease threshold which has to be exceeded before commands are sent to the ride control and/or tire inflation systems. If a payload weight decrease is detected then control passes to block 422, otherwise control passes back to block 402.

At block 422, the load sensitive ride system determines the desired compliance adjustment for the ride control due to the decrease in payload weight. This compliance adjustment depends on the type of ride control system, for example it could be a decrease in ride control accumulator pre-charge pressure (see FIG. 2), or opening up flow through the ride control compliance adjustment valve (see FIG. 3), or some other adjustment depending on how compliance is adjusted in the relevant ride control system. The load sensitive ride system determines the compliance adjustment as a function of the payload weight decrease, and at block 424 sends a command to increase ride control system compliance by the determined amount. At block 426, the load sensitive ride system determines the desired adjustment to tire pressure due to the decrease in payload weight. At block 428, the load sensitive ride system sends a command to the tire inflation system to decrease tire pressure by the determined amount. After the ride control system compliance and tire pressure adjustments have been made control passes back to block 402.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A load sensitive ride system for a vehicle that includes an implement movably attached to the vehicle by a boom cylinder, the load sensitive ride system comprising:
   a payload weight measuring system configured to measure a payload weight in the implement and generate a signal indicative of the payload weight;
   a ride control circuit configured to adjust hydraulic flow to and from the boom cylinder;
   a controller configured to receive the signal indicative of the payload weight, and send compliance commands to adjust compliance of the ride control circuit based on the signal indicative of the payload weight;
   wherein, when the signal indicative of the payload weight indicates increases in the payload weight, the controller sends compliance commands to decrease compliance in the ride control circuit;
   wherein, when the signal indicative of the payload weight indicates decreases in the payload weight, the controller sends compliance commands to increase compliance in the ride control circuit.

2. The load sensitive ride system of claim 1, wherein the vehicle also includes a tire having a tire pressure, the load sensitive ride system further comprising:
   a tire inflation system configured to adjust the tire pressure of the tire of the vehicle;
   wherein the controller is further configured to send inflation commands to the tire inflation system to adjust tire pressure based on the signal indicative of the payload weight.

3. The load sensitive ride system of claim 2, wherein when the signal indicative of the payload weight indicates increases in the payload weight, the controller sends compliance commands to decrease compliance in the ride control circuit and sends inflation commands to increase tire pressure; and when the signal indicative of the payload weight indicates decreases in the payload weight, the controller sends compliance commands to increase compliance in the ride control circuit and sends inflation commands to decrease tire pressure.

4. The load sensitive ride system of claim 1, wherein the ride control circuit comprises an accumulator hydraulically coupled to the boom cylinder, where the accumulator has an adjustable pre-charge pressure; and
   wherein when the signal indicative of the payload weight indicates increases in the payload weight, the controller sends compliance commands to increase the adjustable pre-charge pressure of the accumulator to decrease compliance in the ride control circuit; and when the signal indicative of the payload weight indicates decreases in the payload weight, the controller sends compliance commands to decrease the adjustable pre-charge pressure of the accumulator to increase compliance in the ride control circuit.

5. The load sensitive ride system of claim 4, wherein the ride control circuit further comprises a ride control enable valve configured to control flow between the boom cylinder and the accumulator; and
   wherein when ride control is enabled, the ride control enable valve allows flow between the boom cylinder and the accumulator; and when ride control is not enabled, the ride control enable valve blocks flow between the boom cylinder and the accumulator.

6. The load sensitive ride system of claim 5, wherein the vehicle also includes a tire having a tire pressure, the load sensitive ride system further comprising:
   a tire inflation system configured to adjust the tire pressure of the tire of the vehicle;
   wherein the controller is further configured to send inflation commands to the tire inflation system to adjust tire pressure based on the signal indicative of the payload weight; when the signal indicative of the payload weight indicates increases in the payload weight, the controller sends inflation commands to increase tire pressure; and when the signal indicative of the payload weight indicates decreases in the payload weight, the controller sends inflation commands to decrease tire pressure.

7. The load sensitive ride system of claim 1, wherein the ride control circuit comprises:
    an accumulator hydraulically coupled to the boom cylinder; and
    a compliance adjustment valve configured to control a flow rate between the boom cylinder and the accumulator;
    wherein when the signal indicative of the payload weight indicates increases in the payload weight, the controller sends compliance commands to the compliance adjustment valve to decrease the flow rate between the boom cylinder and the accumulator to decrease compliance in the ride control circuit; and when the signal indicative of the payload weight indicates decreases in the payload weight, the controller sends compliance commands to the compliance adjustment valve to increase the flow rate between the boom cylinder and the accumulator to increase compliance in the ride control circuit.

8. The load sensitive ride system of claim 7, wherein the ride control circuit further comprises a ride control enable valve configured to control flow between the boom cylinder and the accumulator; and
    wherein when ride control is enabled, the ride control enable valve allows flow between the boom cylinder and the accumulator; and when ride control is not enabled, the ride control enable valve blocks flow between the boom cylinder and the accumulator.

9. The load sensitive ride system of claim 8, wherein the vehicle also includes a tire having a tire pressure, the load sensitive ride system further comprising:
    a tire inflation system configured to adjust the tire pressure of the tire of the vehicle;
    wherein the controller is further configured to send inflation commands to the tire inflation system to adjust tire pressure based on the signal indicative of the payload weight; when the signal indicative of the payload weight indicates increases in the payload weight, the controller sends inflation commands to increase tire pressure; and when the signal indicative of the payload weight indicates decreases in the payload weight, the controller sends inflation commands to decrease tire pressure.

10. A load sensitive ride method for a vehicle that includes an implement movably attached to the vehicle by a boom cylinder, the load sensitive ride method comprising:
    measuring a payload weight in the implement;
    receiving a signal indicative of the payload weight;
    determining a compliance adjustment amount for the ride control circuit based on the signal indicative of the payload weight, the ride control circuit configured to control hydraulic flow to and from the boom cylinder; and
    sending a compliance command to adjust compliance of the ride control circuit by the compliance adjustment amount;
    wherein determining a compliance adjustment amount comprises:
        when the signal indicative of the payload weight indicates increases in the payload weight, determining a compliance adjustment amount to decrease compliance in the ride control circuit; and
        when the signal indicative of the payload weight indicates decreases in the payload weight, determining a compliance adjustment amount to increase compliance in the ride control circuit.

11. The load sensitive ride method of claim 10, further comprising:
    determining an inflation adjustment amount for a tire inflation system based on the signal indicative of the payload weight, the tire inflation system configured to adjust tire pressure of a tire of the vehicle; and
    sending an inflation command to the tire inflation system to adjust tire pressure by the inflation adjustment amount.

12. The load sensitive ride method of claim 11, wherein determining a compliance adjustment amount comprises:
    when the signal indicative of the payload weight indicates increases in the payload weight, determining a compliance adjustment amount to decrease compliance in the ride control circuit;
    when the signal indicative of the payload weight indicates decreases in the payload weight, determining a compliance adjustment amount to increase compliance in the ride control circuit; and
wherein determining an inflation adjustment amount comprises:
    when the signal indicative of the payload weight indicates increases in the payload weight, determining an inflation adjustment amount to increase tire pressure;
    when the signal indicative of the payload weight indicates decreases in the payload weight, determining an inflation adjustment amount to decrease tire pressure.

13. The load sensitive ride method of claim 10, wherein the ride control circuit comprises an accumulator hydraulically coupled to the boom cylinder, where the accumulator has an adjustable pre-charge pressure; and
    wherein determining a compliance adjustment amount comprises:
        when the signal indicative of the payload weight indicates increases in the payload weight, determining a compliance adjustment amount to increase the adjustable pre-charge pressure of the accumulator to decrease compliance in the ride control circuit; and
        when the signal indicative of the payload weight indicates decreases in the payload weight, determining a compliance adjustment amount to decrease the adjustable pre-charge pressure of the accumulator to increase compliance in the ride control circuit.

14. The load sensitive ride method of claim 13, wherein the ride control circuit further comprises a ride control enable valve configured to control flow between the boom cylinder and the accumulator; and the method further comprising:
    when ride control is enabled, allowing hydraulic flow through the ride control enable valve between the boom cylinder and the accumulator, and
    when ride control is not enabled, blocking hydraulic flow through the ride control enable valve between the boom cylinder and the accumulator.

15. The load sensitive ride method of claim 14, further comprising:
    determining an inflation adjustment amount for a tire inflation system based on the signal indicative of the payload weight, the tire inflation system configured to adjust tire pressure of a tire of the vehicle; and
    sending an inflation command to the tire inflation system to adjust tire pressure by the inflation adjustment amount; and wherein determining an inflation adjustment amount comprises:

when the signal indicative of the payload weight indicates increases in the payload weight, determining an inflation adjustment amount to increase tire pressure; and when the signal indicative of the payload weight indicates decreases in the payload weight, determining an inflation adjustment amount to decrease tire pressure.

16. The load sensitive ride method of claim 10, wherein the ride control circuit comprises an accumulator hydraulically coupled to the boom cylinder, and a compliance adjustment valve configured to control a flow rate between the boom cylinder and the accumulator; and wherein determining a compliance adjustment amount comprises:

when the signal indicative of the payload weight indicates increases in the payload weight, determining a compliance adjustment amount to decrease the flow rate through the compliance adjustment valve to decrease compliance in the ride control circuit; and when the signal indicative of the payload weight indicates decreases in the payload weight, determining a compliance adjustment amount to increase the flow rate through the compliance adjustment valve to increase compliance in the ride control circuit.

17. The load sensitive ride method of claim 16, wherein the ride control circuit further comprises a ride control enable valve configured to control flow between the boom cylinder and the accumulator; and the method further comprising:

when ride control is enabled, allowing hydraulic flow through the ride control enable valve between the boom cylinder and the accumulator, and when ride control is not enabled, blocking hydraulic flow through the ride control enable valve between the boom cylinder and the accumulator.

18. The load sensitive ride method of claim 17, further comprising:

determining an inflation adjustment amount for a tire inflation system based on the signal indicative of the payload weight, the tire inflation system configured to adjust tire pressure of a tire of the vehicle; and sending an inflation command to the tire inflation system to adjust tire pressure by the inflation adjustment amount; and wherein determining an inflation adjustment amount comprises:

when the signal indicative of the payload weight indicates increases in the payload weight, determining an inflation adjustment amount to increase tire pressure; and when the signal indicative of the payload weight indicates decreases in the payload weight, determining an inflation adjustment amount to decrease tire pressure.

19. A work machine, comprising:

a chassis;

an implement movably coupled to the chassis by a boom cylinder; and a load sensitive ride system, comprising:

a payload weight measuring system configured to measure a payload weight in the implement and generate a signal indicative of the payload weight;

a ride control circuit configured to adjust hydraulic flow to and from the boom cylinder; and a controller configured to receive the signal indicative of the payload weight, and send compliance commands to adjust compliance of the ride control circuit based on the signal indicative of the payload weight;

wherein, when the signal indicative of the payload weight indicates a change in the payload weight, the controller sends a compliance command to adjust the compliance in the ride control circuit.

20. The work machine of claim 19, wherein:

when the signal indicative of the payload weight indicates increases in the payload weight, the controller sends compliance commands to decrease compliance in the ride control circuit;

when the signal indicative of the payload weight indicates decreases in the payload weight, the controller sends compliance commands to increase compliance in the ride control circuit.

* * * * *